United States Patent [19]

Steinsberger et al.

[11] 4,449,868
[45] May 22, 1984

[54] APPARATUS FOR THREADING HOLES

[75] Inventors: Karl Steinsberger; Albert Maier; Walter Herrmann, all of Munich, Fed. Rep. of Germany

[73] Assignee: AGFA-Gevaert Aktiengesellschaft, Leverkusen, Fed. Rep. of Germany

[21] Appl. No.: 333,577

[22] Filed: Dec. 22, 1981

[51] Int. Cl.³ .................. B23Q 5/027; B23G 3/04
[52] U.S. Cl. ................... 408/138; 408/129; 10/139 CN; 10/129 A
[58] Field of Search ............ 10/135 R, 135 N, 139 R, 10/129 A, 129 R, 139 CN; 408/121, 129, 138

[56] References Cited

U.S. PATENT DOCUMENTS

| 2,314,138 | 3/1943 | Garbe et al. | 10/139 R |
| 2,340,477 | 4/1940 | Kruse | 10/129 R |
| 2,715,233 | 4/1950 | Clark | 10/139 R |
| 3,162,873 | 4/1962 | Ohme | 10/139 R |
| 3,179,965 | 10/1961 | Khachigian | 10/139 R |
| 3,348,248 | 11/1965 | Milkert | 10/139 R |
| 3,788,760 | 1/1974 | Daniels | 10/139 R |
| 4,031,584 | 6/1977 | Khachigian | 10/135 R |

FOREIGN PATENT DOCUMENTS 1176450 8/1964 Fed. Rep. of Germany ...... 408/222

Primary Examiner—William R. Briggs
Assistant Examiner—Thomas M. Kline
Attorney, Agent, or Firm—Peter K. Kontler

[57] ABSTRACT

Apparatus is disclosed for threading tapping holes in workpieces wherein the tapping hole is surrounded by a surface having alternating recesses and arcuate projections which are to be threaded. The apparatus has a hold-down plate one side of which is movable against the exposed side of the workpiece, a carrier which is reciprocable toward and away from the workpiece by a plunger and a spring, a tool holder which has external threads meshing with the internal threads of a nut in the hold-down plate and a helical cam groove receiving a pin of the carrier, and a fluted tap which is coaxially affixed to the holder and extends into the tapping hole when the hold-down plate abuts against the workpiece whereby the externally threaded ribs of the tap which alternate with the flutes extend into the recesses in the surface surrounding the tapping hole. The carrier is thereupon moved toward the hold-down plate to cause the tool holder to rotate whereby the tool holder moves axially and the tap cuts or rolls threads into the projections between the recesses in the surface surrounding the tapping hole. The length of the cam groove determines the extent of rotation of the tap, and such extent is selected with a view to ensure that each rib of the tap moves from a preceding recess into the next-following recess when the surface bounding one end of the cam groove terminates the movement of the carrier toward the hold-down plate. The carrier, the means for moving the carrier and the hold-down plate can constitute parts of a stamping machine.

22 Claims, 2 Drawing Figures

APPARATUS FOR THREADING HOLES

BACKGROUND OF THE INVENTION

The present invention relates to thread cutting apparatus in general, and more particularly to improvements in apparatus for making threaded tapping holes in pieces of metallic or other materials.

German Auslegeschrift No. 1,176,450 of Hafner discloses a manually rotatable fluted tap which can be used to cut threads in arcuate internal projections of workpieces, namely, in projections which extend inwardly from the surfaces bounding the so-called tapping holes of the workpieces. The tap is inserted into the hole in such a way that each of its externally threaded ribs extends into one of the recesses between the internal projections of the workpiece, and the tap is thereupon rotated through an angle such that each rib cuts threads in one of the projections, i.e., that each rib advances from a preceding recess into the next-following recess of the surface bounding the tapping hole. An advantage of such mode of threading tapping holes is that the tapping is completed in response to relatively small angular displacement of the tap, i.e., in response to rotation of the tap through less than one full revolution, and also that the tap can be readily withdrawn from the tapping hole upon completion of the thread cutting operation because there is no need to rotate the tap in reverse. However, the German publication of Hafner does not disclose or show any apparatus which can be used to locate, turn and/or withdraw the tap relative to and with reference to a workpiece.

OBJECTS AND SUMMARY OF THE INVENTION

An object of the invention is to provide a novel and improved apparatus for threading tapping holes in workpieces which constitute pieces of sheet metal or the like.

Another object of the invention is to provide a novel and improved apparatus which can be used for the practice of the method disclosed by Hafner.

A further object of the invention is to provide an apparatus which can form part of a stamping or a like machine and which can be used to thread tapping holes in metallic stampings.

An additional object of the invention is to provide an apparatus which can be installed in production lines for automatic treatment of sheet metal workpieces or the like.

Still another object of the invention is to provide the apparatus with novel and improved means for controlling the angular and axial movements of the tap.

A further object of the invention is to provide the apparatus with novel and improved means for transmitting torque to the holder for the tap.

An ancillary object of the invention is to provide the apparatus with novel and improved means for properly locating and orienting the tap with reference to the tapping hole in a workpiece.

An additional object of the invention is to provide a novel and improved method of threading tapping holes in massproduced workpieces.

Another object of the invention is to provide the apparatus with novel and improved means for facilitating rapid and convenient extraction of the tap from the tapping hole when the thread cutting operation is completed.

An additional object of the invention is to provide an apparatus of the above outlined character which can employ several component parts of a stamping or punching machine.

A further object of the invention is to provide the apparatus with novel and improved means for preventing excessive angular displacements of the tap with reference to the workpiece.

The invention is embodied in an apparatus which can form part of a sheet metal treating production line and serves to thread tapping holes in workpieces (e.g., in sheet metal panels or plates) of the type wherein the surface surrounding the tapping hole has recesses for externally threaded ribs of a fluted tap and the workpiece has internal projections alternating with the recesses and extending along arcs of predetermined length (the length of each arc will depend on the number of flutes and ribs, on the length of the recesses as considered in the circumferential direction of the surface surrounding the tapping hole, and on the length of the ribs, again as considered in the circumferential direction of the aforementioned surface).

The apparatus comprises a hold-down device (e.g., a device which has a plate with a flat side movable into engagement with one side or surface of a workpiece to be treated while such workpiece rests on an anvil or another suitable support having a socket or bore in register with the tapping hole of the workpiece) including an internally threaded portion (such internally threaded portion may constitute a nut which is non-rotatably installed in the plate so that it is coaxial with the tapping hole when the aforementioned side of the plate abuts against the workpiece), a tool holder having external threads meshing with the threads of the internally threaded portion or nut of the hold-down device so that rotation of the tool holder entails an axial movement of the holder relative to the hold-down device, a tap which is coaxially mounted in the tool holder and has a portion extending beyond the work-contacting side of the plate forming part of the hold-down device (the tap is formed with axially parallel flutes alternating with axially parallel ribs having external threads whose pitch matches that of internal threads in the nut of the hold-down device), a carrier for the hold-down device (such carrier may constitute a reciprocable ram which is movable with reference to the hold down-device when the latter engages the workpiece), and cam and follower means provided on the carrier and on the tool holder and serving (a) to rotate the tool holder and the tap in response to movement of the carrier relative to the hold-down device while the hold-down device abuts against the workpiece and while each rib of the tap extends into a recess of the surface surrounding the tapping hole before the holder and the tap are set in rotary motion, and (b) through an angle which is selected in such a way that each rib of the tap moves from a preceding recess (in which the rib is located before the holder is set in rotary motion) into the neighboring recess in the surface surrounding the tapping hole of the workpiece so that the threads of the ribs cut or roll threads into the internal projections of the workpiece.

The apparatus preferably further comprises means (e.g., a piston rod or a connecting rod) for moving the carrier relative to the hold-down device in a first direction in which the internally threaded portion or nut of the hold-down device causes the tool holder to move the tap relative to the tapping hole with attendant cutting of threads in the projections of the workpiece, and one or more helical springs or other suitable means for biasing the carrier in a second direction counter to the first direction so that the tool holder moves the ribs of the tap from the aforementioned neighboring recesses back into the respective preceding recesses.

The cam and follower means preferably include first and second stops which respectively limit the extent of movement of the carrier in the first and second directions, i.e., which determine the extent of axial movement of the aforementioned portion of the tap with reference to the tapping hole. The carrier is preferably confined to movement in the axial direction of the tool holder, e.g., by one or more tie rods, guide posts or analogous devices extending in parallelism with the tap and its holder and preferably mounted in the hold-down device. The cam of the cam and follower means can be provided on the tool holder and may include a helical groove in the periphery of the holder. The groove is bounded by a surface including two end portions at the respective ends of the groove, and such end portions can constitute the aforementioned stops which determine the extent of axial movement of the carrier toward and away from the hold-down device, namely, under the action of the aforementioned piston rod or connecting rod or under the action of the biasing means.

The tap is preferably separably but non-rotatably secured to the tool holder. For example, the tool holder can have an axial bore for a shank or stem of the tap, and the means for releasably securing the tap to its holder can comprise one or more pins extending diametrically of the axial bore in the holder and diametrically of the shank. The pin can extend through a diametrically extending bore of the shank or it can engage a flat at the exterior of the shank.

The axial length of that portion of the tap which extends beyond the work-engaging side of the hold-down device preferably exceeds the depth or axial length of the tapping hole in the workpiece. The apparatus can comprise auxiliary hold-down means which is yieldably mounted on and normally extends beyond the work-engaging side of the hold-down device. When the hold-down device is moved toward engagement with the workpiece to be treated, the auxiliary hold-down means yields in response to engagement with the workpiece and is preferably at least partially retracted into a suitable opening, hole or socket of the hold-down device. The auxiliary hold-down means can comprise a plunger which is guided in a bore of the hold-down device and is biased to an extended position by a helical spring or the like. The distance through which the auxiliary hold-down means extends beyond the aforementioned side of the hold-down device when the auxiliary hold-down means is out of contact with the workpiece preferably exceeds the axial length of the aforementioned portion of the tap, i.e., the auxiliary hold-down means engages the workpiece before the tip of the tap reaches the respective end of the tapping hole.

The follower of the cam and follower means can constitute a stud or pin which is affixed to the carrier and extends into the aforementioned helical or spiral groove of the cam on or in the tool holder.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
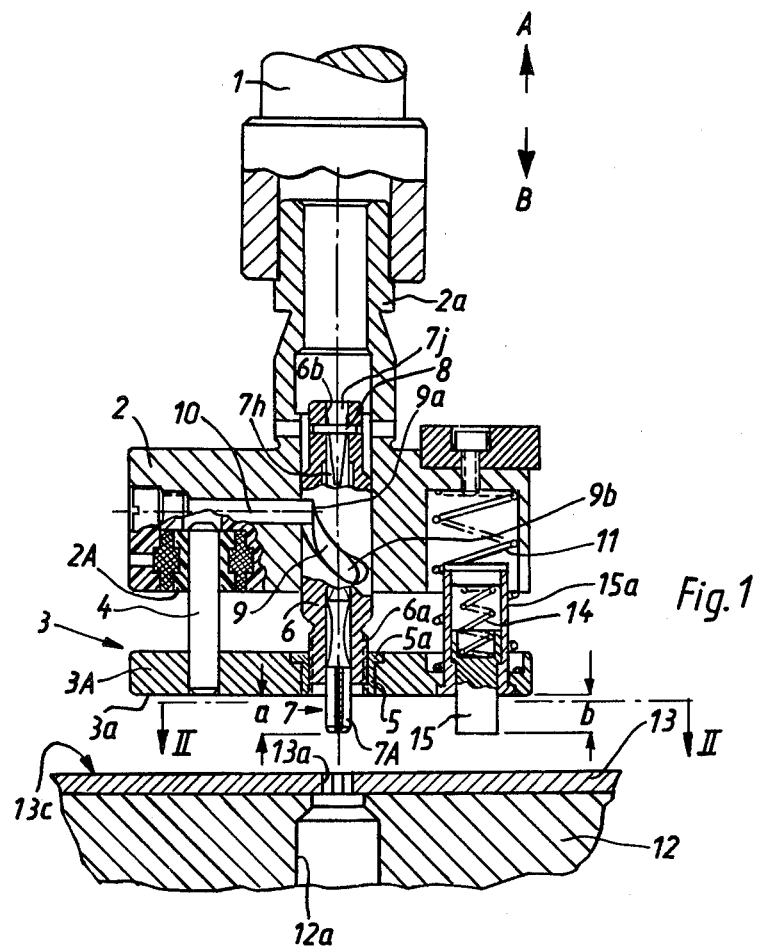
FIG. 1 is a fragmentary partly elevational and partly central vertical sectional view of an apparatus which embodies the invention and is designed to thread tapping holes in flat sheet-like workpieces.

Referring first to FIG. 1, there is shown an apparatus which can be used to thread tapping holes 13a in flat workpieces 13 consisting of sheet metal or the like. The apparatus includes certain component parts, such as a reciprocable piston rod or connecting rod 1 for the extension 2a of a carrier 2, which are similar to the punching ram of a stamping or punching machine adapted to be used in a sheet metal treating center or plant of the type known as NC-CNC or DNC center. The carrier 2 is movable with or relative to a hold-down device 3 which includes a plate-like member 3A having a work-contacting side or surface 3a. The hold-down device 3 further comprises a centrally located internally threaded portion 5 which may constitute a separately manufactured nut non-rotatably installed in the central portion of the plate 3A. The means for confining the carrier 2 to movement in parallelism with the axis of the nut 5 (with reference to or together with the device 3, or vice versa) includes one or more tie rods or guide pins 4 which are anchored in the plate 3A and are slidable in plastic (preferably self-lubricating) bearing sleeves 2A of the carrier 2. The side 3a of the plate 3A is flat, the same as the upper side or surface 13c of the workpiece 13 which rests on an anvil 12 or an analogous support at a level below the hold-down device 3. The anvil 12 has an aperture 12a which registers with the tapping hole 13a of a properly located workpiece 13.

A tool holder 6 has external threads 6a which mesh with the internal threads 5a of the nut 5. The pitch of the threads 5a, 6a corresponds to that of the threads which are to be cut or rolled into the workpiece 13. When the holder 6 is caused to rotate with reference to the hold-down device 3, it is compelled to move axially upwardly or downwardly, as viewed in FIG. 1. An axial bore 6b of the holder 6 receives the shank 7h of an elongated tap 7 having a lower end portion 7A which extends beyond the side 3a of the plate 3A through a distance a exceeding the axial length of the tapping hole 13a in the workpiece 13 therebelow. The shank 7h has a flat 7j which is adjacent to a removable securing pin 8 extending diametrically of the bore 6b and diametrically of the respective portion of the shank 7h. If desired, the upper portion of the shank 7h may be a solid cylinder with a diametrically extending bore for the central portion of the securing pin 8.

Figure 2:
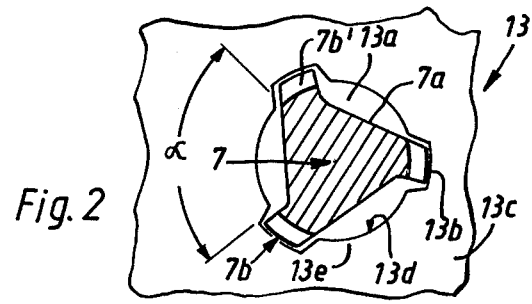
FIG. 2 is an enlarged sectional view as seen in the direction of arrows from the line II—II of FIG. 1.

FIG. 2 shows that the lower portion of the tap 7 has three equidistant axially parallel flutes 7a which alternate with three ribs 7b having threads 7b'. The ribs 7b can be received in complementary recesses 13b which are provided in the surface 13d surrounding the tapping hole 13a of the workpiece 13. The recesses 13b alternate with arcuate internal projections 13e of the surface 13d. The reference character 13c denotes that side or surface of the workpiece 13 which can be contacted by the side 3a of the plate 3A when the apparatus is ready to cut or roll threads into the internal projections 13e. The angle alpha denotes the arcs along which the projections 13e extend, i.e., this angle denotes the distance between two neighboring recesses 13b, as considered in the circumferential direction of the surface 13d.

In order to ensure that the tap 7 will not rotate or move axially with reference to the holder 6, the flat 7j can cooperate with a similar flat in the bore 6b and the securing pin 8 can extend through the shank 7h of the tap. The pitch of threads 7b' on the ribs 7b of the tap 7 matches the pitch of the threads 5a or 6a.

The means for rotating the tool holder 6 and the tap 7 relative to the hold-down device 3 in response to movement of the carrier 2 with reference to the plate 3A in the directions indicated by arrows B and A, i.e., toward or away from the plate 3A, comprises a cam and follower unit including a cam which is constituted by the upper portion of the holder 6 and has a helical cam groove 9 bounded by a suitable surface having two end portions 9a, 9b which constitute stops or abutments for a follower pin, post or stud 10 fixedly but preferably removably installed in the carrier 2 so that its tip extends into the cam groove 9. It will be readily appreciated that, when the carrier 2 is moved toward the hold-down device 3 while the side 3a of the plate 3A abuts against the surface 13c of the workpiece 13 on the anvil 12, the holder 6 and the tap 7 are compelled to rotate with reference to the nut 5 whereby the tap 7 moves axially and the threads 7b' of its ribs 7b cut or roll threads in the projections 13e of the workpiece 13. The distance between the stops 9a and 9b is selected in such a way that each rib 7b (which is assumed to be received in a recess 13b when the side 3a of the plate 3A abuts against the surface 13c while the carrier 2 is located at a maximum distance from the plate 3A, i.e., when the stud 10 abuts against the stop 9a) turns through an angle that is required to move each rib 7b from a preceding recess 13b into the next-following recess 13b during the interval which is required to move the holder 6 axially through a distance such that the stud 10 then abuts against the stop 9b. During such rotation of the holder 6, the tap 7 moves upwardly, as viewed in FIG. 1, and through an angle corresponding to the angle alpha shown in FIG. 2. The carrier 2 is thereupon automatically returned to the illustrated position with reference to the plate 3A by a helical spring 11 or an analogous biasing device which reacts against the plate 3A and bears against an internal surface of the carrier 2. When the spring 11 is free to expand, the ribs 7b of the tap 7 return into the preceding recesses 13b, namely, into the recesses which received such ribs prior to movement of the carrier 2 toward the plate 3A of the hold-down device 3. The carrier 2 is movable in the direction of arrow B under the action of the member 1 which is movable in such direction by a disc cam, by an eccentric or by any other suitable means which enables the spring 11 to expand when the carrier 2 completes its movement in the first direction (arrow B). Expansion of the spring 11 results in a movement of the carrier 2 in the direction of arrow A, i.e., counter to the first direction (arrow B).

The plate 3A of the hold-down device 3 preferably supports a second or auxiliary hold-down means including a plunger 15 which is reciprocable in the bore of a cylinder 15a installed in the plate 3A and further containing a spring 14 which urges the plunger 15 downwardly so that, when the lower end of the plunger 15 does not abut against the workpiece 13, this plunger extends beyond the side 3a through a distance b exceeding the distance a. This ensures that the plunger 15 engages and holds the workpiece 13 against shifting before the portion 7A of the tap 7 enters the hole 13a. The plunger 15 is caused to enter the cylinder 15a (i.e., it is confined in the plate 3A of the hold-down device 3) when the side 3a comes in contact with the surface 13c of the workpiece 13. An advantage of the auxiliary hold-down means 14, 15, 15a is that it prevents or reduces the likelihood of any shifting of the workpiece 13 before the tip of the tap 7 enters the hole 13a. Once the tip of the tap 7 has penetrated into the hole 13a, the side 3a continues to move toward the surface 13c (i.e., the carrier 2 and the hold-down device 3 move as a unit in the direction which is indicated by the arrow B), and such movement is terminated (to be followed by movement of the carrier 2 relative to the plate 3A) when the plate 3A engages and is arrested by the workpiece 13. The cam and follower unit 9, 10 then causes the holder 6 to rotate with the tap 7 while the carrier 2 moves downwardly to stress the spring 11 and to cause the stop 9b to move toward and into engagement with the tip of the stud 10. The holder 6 and the tap 7 rotate in a clockwise direction, as seen from the top of FIG. 1. The nut 5 guides the holder 6 in such a way that the threads 7b' of the ribs 7b do not damage the projections 13e and/or deface the freshly cut or rolled threads in the projections 13e even if the workpiece 13 consists of very thin or extremely thin sheet metal stock.

When the stop 9b in the cam groove 9 reaches the stud 10, the pressure upon the carrier 2 in the direction of arrow B is relaxed or terminated so that the spring 11 is free to expand and to return the carrier 2 to the illustrated position with reference to the plate 3A, i.e., the stop 9a then moves back toward the stud 10. The holder 6 rotates in a counterclockwise direction, as seen from the top of FIG. 1, because the carrier 2 moves in the direction of arrow A. This returns the ribs 7b of the tap 7 to their initial angular positions, i.e., each rib 7b is located in a recess 13b and the entire apparatus can be lifted (or the workpiece 13 lowered) in order to extract the portion 7A of the tap 7 from the hole 13a. The auxiliary hold-down means 14, 15, 15a holds the finished workpiece 13 against movement relative to the anvil 12 during lifting of the plate 3A above the surface 13c, i.e., during extraction of the lower portion 7A of the tap 7 from the hole 13a.

As mentioned above, the extent (b) to which the plunger 15 of the auxiliary hold-down means extends beyond the side 3a of the plate 3A exceeds the distance a when the plunger 15 does not engage the workpiece 13; this ensures that the plunger 15 engages the surface 13c of the workpiece 13 before the portion 7A of the tap 7 begins to enter the hole 13a and also that the plunger 15 remains in contact with the surface 13a during a certain interval following extraction of the tap portion 7A from the hole 13a. The length a of the tap portion 7A depends on the extent to which the tap 7 must penetrate into the hole 13a as well as on the desired position of the tap portion 7A with reference to the workpiece 13 at the time the carrier 2 begins to rotate the holder 6 while the carrier moves relative to the hold-down device 3 (in the direction indicated by arrow B), i.e., at the start of the step of cutting or rolling threads into the projections 13e of the workpiece.

An important advantage of the improved apparatus is that it can form part of a sheet treating line, e.g., of a so-called sheet metal treating center. The cam and follower means 9, 10 enable the reciprocable carrier or ram 2 to impart to the holder 6 and tap 7 a rotary movement while the carrier moves relative to the hold-down device 3, and the stoos 9a, 9b limit the extent of clockwise or counterclockwise rotary movement of the tap 7 so that the tap can be readily inserted into a tapping hole 13a prior to cutting or rolling of threads and that the tap can be readily extracted from the hole 13a upon completion of the thread cutting operation. Thus, whereas the reciprocatory movements of the carrier 2 can serve to impart appropriate movements to a stamping tool, the provision of the follower stud 10 and cam groove 9 in the holder 6 enables the holder 6 to rotate the tap 7 through angles of predetermined magnitude in response to movement of the carrier 2 under the action of the moving means 1 or under the action of the spring 11. The tap 7 may constitute one of a series of tools which are used in the aforementioned center wherein the tools can be moved from station to station to form and/or treat successive workpieces or wherein the workpieces are moved from station to station to be treated by a succession of different tools.

Another important advantage of the improved apparatus is that the holder 6 and its tap 7 are set in rotary motion in automatic response to engagement of the side 3a with the surface 13c and subsequent movement of the carrier 2 toward the plate 3A (arrow B) or in response to expansion of the spring 11. At the time the holder 6 is set in rotary motion, the hold-down device 3 securely holds the workpiece 13 against any shifting with reference to the anvil 12 and/or tap 7, and the auxiliary hold-down means 14, 15, 15a securely holds the workpiece 13 against any shifting relative to the anvil 12 during extraction of the tap 7 from the hole 13a, i.e., upon completion of the thread cutting or rolling step. The nut 5 in the plate 3A ensures that the threads 7b' of the ribs 7b cannot damage the freshly formed threads in the projections 13e during rotation of the holder 6 under the action of the spring 11 and also that the pitch or lead of threads which are cut or rolled into a long series of successive workpieces is always the same. Moreover, the nut 5 cooperates with the externally threaded portion 6a of the tool holder 6 to ensure that the tap 7 cannot damage the freshly formed threads in a relatively thin, relatively thick, relatively soft or relatively hard workpiece. In the case of relatively hard and/or thick workpieces, it may be advisable to provide for a plurality of parallel cams 9 and followers 10 or, better yet, a thread with a plurality of taps and of suitable pitch on the holder and a corresponding thread on the carrier's inside. Abrasion will thus be minimized. The flat workpieces of sheet metal to be provided with tapping holes may be components of photographic copying machines, developing machines, printers or the like. They may be processed, for example, on a CNC Sheet Metal Machining Center Trumatic 300 as described in leaflets distributed by Trumpf GmbH+Co., Maschinenfabrik under the number 4025/A-E. In these machining centers, all tapping holes of one diameter are punched in a first step the tap forms the threads in all the holes with high efficiency in a second step.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for threading a tapping hole having internal projections which alternate with recesses for externally threaded ridges of a fluted tap, said apparatus comprising:
   (a) a hold-down device having a side movable against a workpiece provided with a tapping hole to be threaded, said device also having an internally threaded portion;
   (b) a holder mounted for rotation and having external threads meshing with the internal threads of said internally threaded portion so that rotation of said holder entails axial movement thereof and said holder is guided by said device;
   (c) a tap mounted in said holder and having substantially parallel flutes alternating with substantially parallel, externally threaded ribs;
   (d) a carrier for said device movable with reference to the latter;
   (e) cooperating guide means on said carrier and said holder arranged to rotate said holder in response to relative movement of said carrier and said device; and
   (f) limiting means for limiting rotation of said holder to a predetermined angle which corresponds to a fractional revolution of said tap.

2. The apparatus of claim 1, said tap being rotatable through said predetermined angle between a starting position and a terminal position in response to relative movement of said carrier and said device in a first direction; and further comprising biasing means for biasing said carrier and said device relative to one another in a second direction counter to said first direction, said biasing means being designed to urge said tap into said starting position.

3. The apparatus of claim 1, wherein said predetermined angle approximates or equals the angle between neighboring ones of said ribs.

4. The apparatus of claim 1, wherein said tap is coaxially mounted in said holder.

5. The apparatus of claim 1, wherein the external threads of said ribs have a pitch substantially matching the pitch of said internal threads of said device.

6. The apparatus of claim 1, wherein said guide means comprises cam and follower means.

7. The apparatus of claim 6, wherein said cam and follower means comprises a cam provided on said holder and having a spiral groove, and a follower including a stud affixed to said carrier and extending into said groove.

8. The apparatus of claim 1, said tap being rotatable through said predetermined angle between a starting position and a terminal position; and wherein said limiting means comprises a stop on said guide means for arresting said tap in said starting position upon movement of said tap towards the latter.

9. The apparatus of claim 1, wherein said tap has a portion which extends beyond said side of said device.

10. The apparatus of claim 9 for threading tapping holes of predetermined axial length wherein the axial length of said portion of said tap exceeds said predetermined length.

11. The apparatus of claim 1, wherein said carrier engages mounting means of a sheet-metal treating line.

12. The apparatus of claim 1, wherein said hold-down device includes a plate and said internally threaded portion is a nut installed in said plate.

13. The apparatus of claim 1, comprising guide means for confining said carrier and said hold-down device to relative movement in the axial direction of said holder.

14. The apparatus of claim 1, wherein said carrier is a reciprocable ram; and further comprising means for moving said ram in a first direction axially of said holder and resilient means for urging said ram in a second direction counter to said first direction.

15. The apparatus of claim 1, comprising means for non-rotatably but separably securing said tap to said holder.

16. The apparatus of claim 15, wherein said holder has an axial bore and said tap has a shank extending into said bore, said securing means comprising a pin extending substantially diametrically of said bore and said shank.

17. Apparatus for threading tapping holes in workpieces of the type wherein the surface surrounding the tapping hole has recesses for externally threaded ribs of a fluted tap and the workpiece has internal projections alternating with the recesses and extending along arcs of predetermined length, comprising a hold-down device having a side movable against the workpiece to be treated and having an internally threaded portion; a holder mounted for rotation and having external threads meshing with the threads of said internally threaded portion so that rotation of said holder entails an axial movement thereof; a tap coaxially mounted in said holder and having a portion extending beyond said side of said device, said tap having axially parallel flutes alternating with axially parallel ribs having external threads whose pitch matches the pitch of the threads in said internally threaded portion of said device; a carrier for said device, said carrier being mounted to be movable with reference to said device; cam and follower means provided on said carrier and said holder and arranged to rotate said holder (a) in response to movement of said carrier relative to said device while said side of said device abuts against the workpiece to be treated and while each rib of said tap extends into a recess of the surface surrounding the tapping hole before said holder is set in rotary motion, and (b) through an angle such that each rib of said tap moves from a preceding recess into the neighboring recess in the surface of the workpiece so that the threads of said ribs form threads in the internal projections of the workpiece; means for moving said carrier relative to said device in a first direction in which said internally threaded portion of said device causes said holder to move said tap relative to the tapping hole with attendant formation of threads in the projections of the workpiece; and means for biasing said carrier in a second direction counter to said first direction so that said holder moves said ribs of said tap from said neighboring recesses back into the respective preceding recesses, said cam and follower means including a stop which limits the extent of movement of said carrier in said second direction to a predetermined angle which corresponds to a fractional revolution of said tap.

18. The apparatus of claim 17, wherein said cam and follower means includes an additional stop which limits the extent of movement of said carrier in said first direction.

19. The apparatus of claim 18, wherein the cam of said cam and follower means is provided on said holder and includes a helical groove bounded by a surface having first and second end portions constituting the respective stops.

20. The apparatus of claim 17, wherein said first and second directions are parallel to the common axis of said holder and said tap.

21. Apparatus for threading tapping holes in workpieces of the type wherein the surface surrounding the tapping hole has recesses for externally threaded ribs of a fluted tap and the workpiece has internal projections alternating with the recesses and extending along arcs of predetermined length, comprising a hold-down device having a side movable against the workpiece to be treated and having an internally threaded portion; a holder mounted for rotation and having external threads meshing with the threads of said internally threaded portion so that rotation of said holder entails an axial movement thereof; a tap coaxially mounted in said holder and having a portion extending beyond said side of said device, said tap having axially parallel flutes alternating with axially parallel ribs having external threads whose pitch matches the pitch of the threads in said internally threaded portion of said device; a carrier for said device said carrier being mounted to be movable with reference to said device; cam and follower means provided on said carrier and said holder and arranged to rotate said holder (a) in response to movement of said carrier relative to said device while said side of said device abuts against the workpiece to be treated and while each rib of said tap extends into a recess of the surface surrounding the tapping hole before said holder is set in rotary motion, and (b) through an angle such that each rib of said tap moves from a preceding recess into the neighboring recess in the surface of the workpiece so that the threads of said ribs form threads in the internal projections of the workpiece; and auxiliary hold-down means yieldably mounted on and extending beyond said side of said device when the latter is disengaged from the workpiece, said auxiliary hold-down means being arranged to yield and to be at least partially concealed in said device while the latter moves its side against the workpiece.

22. The apparatus of claim 21, wherein the distance through which said auxiliary hold-down means extends beyond said side of said hold-down device exceeds the axial length of said portion of said tap.

* * * * *